United States Patent
McGiffney

Patent Number: 5,866,011
Date of Patent: Feb. 2, 1999

[54] METHOD OF CONTROLLING SCALE FORMATION IN BRINE CONCENTRATION AND EVAPORATION SYSTEM

[75] Inventor: Gregory J. McGiffney, Bakersfield, Calif.

[73] Assignee: BetzDearborn Inc., Trevose, Pa.

[21] Appl. No.: 846,701

[22] Filed: Apr. 30, 1997

[51] Int. Cl.$^6$ .................................................. C02F 5/10
[52] U.S. Cl. ................ 210/698; 159/47.3; 159/DIG. 13; 203/7; 252/180
[58] Field of Search .................................. 159/47.1, 47.3, 159/27.4, 901, DIG. 2, DIG. 8, DIG. 13, DIG. 16; 203/7, 11, DIG. 17; 210/698–701; 252/180

[56] References Cited

U.S. PATENT DOCUMENTS

| | | | |
|---|---|---|---|
| 4,654,159 | 3/1987 | Bush et al. | 252/95 |
| 5,062,962 | 11/1991 | Brown et al. | 210/698 |
| 5,156,706 | 10/1992 | Sephton | 159/47.1 |
| 5,562,830 | 10/1996 | Zidovec et al. | 210/699 |
| 5,616,278 | 4/1997 | Carey et al. | 252/180 |

*Primary Examiner*—Peter A. Hruskoci
*Attorney, Agent, or Firm*—Alexander D. Ricci; Richard A. Paikoff

[57] ABSTRACT

A method of treating water to inhibit the formation of salt scale is disclosed. The method is particularly effective at inhibiting the formation and deposition of mineral salts in brine concentration and evaporation systems. The method comprises introducing into the system a polyepoxysuccinic acid of the general formula:

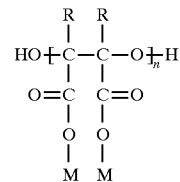

where n ranges from about 2 to about 50, M is hydrogen or a water soluble cation such as $Na^+$, $NH_4^+$ or $K^+$ and R is hydrogen, $C_{1-4}$ alkyl or $C_{1-4}$ substituted alkyl.

8 Claims, No Drawings

METHOD OF CONTROLLING SCALE FORMATION IN BRINE CONCENTRATION AND EVAPORATION SYSTEM

FIELD OF THE INVENTION

The present invention relates to the treatment of water to inhibit the formation of scale. More particularly, the present invention relates to the use of a polyepoxyouccinic acid to inhibit scale formation in brine concentration and evaporation systems.

BACKGROUND OF THE INVENTION

In the use of brine evaporators for the disposal of wastewaters and the reliance on seeded slurry brine recycle for scale control, scaling problems have been reported with the addition of conventional scale inhibitors, i.e., polyphosphates and polyacrylates; such scaling requires frequent and costly interruptions for descaling. Such descaling is often needed on about a 3 to 6 month cycle, with chemicals or by hydroblasting the scale from evaporator surfaces, with a reduction of evaporator productivity rates to about 60% of design capacity.

Brine concentrators take cooling tower blowdown (and other high TDS, TSS) waste, and concentrate this waste into solid waste material that can be disposed of in landfills. As a part of a zero discharge strategy, this apparatus is used when plants do not wish to or cannot discharge waste water into sewer systems.

The brine concentrator uses a vertical heat exchanger (condenser) to heat the waste water entering the process. This waste water is heated, turned into steam, with the water evaporating off being condensed as pure water used for boiler feed water make up. The brine residual solution that results is condensed in the base of the unit and removed as a highly concentrated slurry that is filter pressed and removed from the plant as solid waste.

The brine concentrator has a pressure indicator on the condenser, which displays whether it is being fouled by the concentrated brine residual by-products. These are typically dominated by calcium carbonate and calcium phosphate adhering to the condenser tube surfaces. At start up, the condenser typically has a back pressure of about 3 to 4 psi. As it fouls, the condenser has an increase of pressure to 5–6 psi, when it may then be shut down and cleaned.

The present invention has particular applicability at high temperatures (including those at or above the boiling point for water) and briny conditions where retrograde soluble salts such as calcium carbonate, calcium phosphate, etc. can be considered as potential foulants. Any area where high temperature and high solids loading (including brine and/or supersaturated conditions) where mineral scale foulants of this nature can occur will have applicability for the present invention. These include brine concentrators, evaporators, down-hole steam injection and recovery used in the geothermal power industry, and steam injection and recovery used in oil production and exploration.

DETAILED DESCRIPTION OF THE INVENTION

The method of the present invention comprises treating industrial waters with a polyepoxysuccinic acid (hereinafter Polymer A) of the general formula:

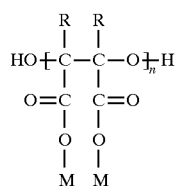

where n ranges from about 2 to 50, preferably 2 to 25, M is hydrogen or a water soluble cation such as $Na^+$, $NH_4^+$ or $K^+$ and R is hydrogen, $C_{1-4}$ alkyl or $C_{1-4}$ substituted alkyl (preferably R is hydrogen).

A method of preparing a polyepoxysuccinic acid similar to that employed as a scale control agent in the present invention is described in U.S. Pat. No. 4,654,159, Bush et al. The Bush et al. patent describes ether hydroxypolycarboxylate prepared from epoxy succinates by treatment with an alkaline calcium compound. The polyepoxysuccinic acid of a specific molecular weight distribution is described in Bush et al. as a useful detergent builder due to its ability to act as a sequestering agent. The sequestering agent of Bush et al. complexes with hardness cations in water supplies which aids in detergent processes by preventing the cations from adversely effecting the detergents.

In the present invention, the polyepoxysuccinic acid is added to aqueous brine concentration and evaporation systems at substoichiometric levels to inhibit mineral scale formation (e.g., calcium carbonate, calcium sulfate, calcium phosphate) without interfering with the process of concentrating solids. The method of the present invention provides such control at relatively low active treatment levels without the use of phosphates or phosphonates.

DESCRIPTION OF THE PREFERRED EMBODIMENTS

The present invention pertains to a novel method of controlling the formation and deposition of scale forming salts in a brine concentration and evaporation system. Specifically, the method of the present invention comprises adding to the system a polyepoxysuccinic acid of the general formula:

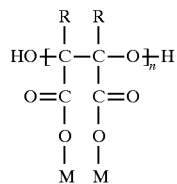

where n ranges from about 2 to 50, preferably 2 to 25, M is hydrogen or a water soluble cation such as $Na^+$, $NH_4^+$ or $K^+$ and R is hydrogen, $C_{1-4}$ alkyl or $C_{1-4}$ substituted alkyl (preferably R is hydrogen).

The polyepoxysuccinic acid material employed in the present invention can be obtained by the polymerization of epoxysuccinate in the presence of calcium hydroxide or other alkaline calcium salts. The general reaction can be represented as follows:

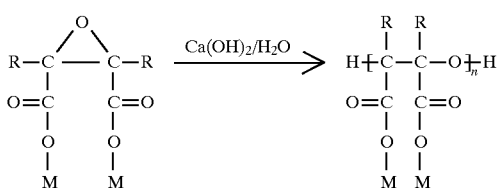

A complete description of a method of preparing such a polyepoxysuccinic acid of a specific molecular weight distribution is included in U.S. Pat. No. 4,654,159, incorporated herein by reference.

The treatment levels of polyepoxysuccinic acid added to a brine concentration and evaporation system can range from about 25 parts per billion up to about 500 parts per million. The preferred treatment levels range from about 10 ppm up to about 100 ppm. The concentration of polyepoxysuccinic acid necessary to provide effective scale control will, of course, vary from system to system. The treatment level will vary, in part, with changes in temperatures, pH, and LSI. However, in all cases, the concentration of polyepoxysuccinic acid added to an aqueous water system in accordance with the present invention is at substoichiometric concentrations. That is, the concentration of polyepoxysuccinic acid is much lower than the concentration of the scale forming material in the system to be treated.

As noted, the treatment of the present invention may be added to a brine concentration and evaporation system, a description of which is found at FIG. 1 of U.S. Pat. No. 5,156,706, the entire disclosure incorporated herein by reference.

The present invention will now be further described with reference to a number of specific examples which are to be regarded solely as illustrative and not as restricting the scope of the present invention.

In the testing of the present invention, a brine concentrator (available commercially from Resources Conservation Company, or RCC), which takes water with a high amount of impurities and concentrates it down into a brine, which can then be filter pressed, was utilized at a particular facility. Various means to inhibit scale in the brine concentrator had, in fact, been attempted by the facility. One method involved the use of dodecylbenzene sulfonic acid to inhibit mineral scale formation in this highly supersaturated environment, which resulted in the undesirable production and carry over of foam.

An attempt was made to identify a mineral scale inhibitor that did not foam excessively in the brine concentrator. Effectiveness against mineral scale formation was identified by monitoring the vacuum condenser pressure. Note that as pressure increases from about 3.5 to about 6.0 psia, a unit would normally be shut down for cleaning. If vacuum condenser pressure could be maintained as close to 3.5 psia from the start to completion of the run, fewer shutdowns for cleaning would be needed, and overall efficiency of the process would remain high.

The conditions of the test were: Ratio ppm Ca (as Ca) to $SiO_2$ of 2.5–3.0 to 1; feed pH 5.4–6.0; sump pH 6.5–7.8; Ca (as $CaCO_3$) 110–440 ppm; $SiO_2$ 40–125 ppm.

The injection of polyepoxysuccinic acid (Polymer A) took place at the beginning of the brine concentrator run. Polymer A was added at a dosage of from about 10 to 12 ppm. During the treatment of the apparatus, the pressure in the condenser remained at about 4.0±0.4 psia, and in fact, has run without significant rise in pressure, with no shutdown for cleaning necessary.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of controlling the formation and deposition of scale forming salts in a brine concentration and evaporation system used for the disposal of waste water comprising introducing into said waste water a substoichiometric amount sufficient for the purpose of a treatment comprising a polyepoxysuccinic acid of the general formula:

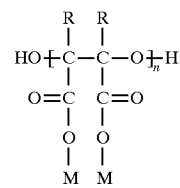

wherein n ranges from about 2 to about 50, M is hydrogen or a water soluble cation and R is hydrogen, $C_{1-4}$ alkyl or $C_{1-4}$ substituted alkyl.

2. The method as recited in claim 1 wherein said scale forming salts include calcium carbonate.

3. The method as recited in claim 1 wherein M is selected from the group consisting of $Na^+$, $NH_4^+$, and $K^+$.

4. The method as recited in claim 1 wherein said a polyepoxysuccinic acid is added to the waste water at active treatment levels ranging from about 25 parts per billion to about 500 parts per million.

5. The method as recited in claim 4 wherein said a polyepoxysuccinic acid is added to the waste water at active treatment levels ranging from about 10 parts per million to about 100 parts per million.

6. The method as recited in claim 1 wherein n ranges from about 2 to about 25.

7. The method as recited in claim 1 wherein said scale forming salts include calcium sulfate.

8. The method as recited in claim 1 wherein said scale forming salts include calcium phosphate.

\* \* \* \* \*